United States Patent [19]
Murabe et al.

[11] Patent Number: 5,731,831
[45] Date of Patent: Mar. 24, 1998

[54] DYNAMIC-PRESSURE GAS BEARING STRUCTURE AND OPTICAL DEFLECTION SCANNING APPARATUS

[75] Inventors: Kaoru Murabe, Nishinomiya; Tetsuya Katayama, Amagasaki; Osamu Komura, Osaka; Mikio Nakasugi, Tama; Taku Fukita, Tokyo; Isshin Sato, Yokohama, all of Japan

[73] Assignees: Canon Kabushiki Kaisha, Tokyo; Sumitomo Electric Industries, Ltd., Osaka, both of Japan

[21] Appl. No.: 614,171

[22] Filed: Mar. 8, 1996

[30] Foreign Application Priority Data

| Mar. 13, 1995 | [JP] | Japan | 7-053002 |
| Mar. 13, 1995 | [JP] | Japan | 7-053003 |
| Mar. 1, 1996 | [JP] | Japan | 8-044464 |

[51] Int. Cl.⁶ .................... G01D 15/16; F16C 32/06
[52] U.S. Cl. .................... 347/259; 384/115; 384/118; 369/44.22
[58] Field of Search ................ 347/259; 369/44.22; 358/491; 384/12, 115, 118, 120

[56] References Cited

U.S. PATENT DOCUMENTS

| 4,747,705 | 5/1988 | Agrawal | 384/118 |
| 5,270,737 | 12/1993 | Nakasugi et al. | 346/108 |
| 5,315,196 | 5/1994 | Yoshida et al. | 310/90 |
| 5,357,272 | 10/1994 | Watanabe et al. | 346/108 |
| 5,434,695 | 7/1995 | Saito et al. | 359/200 |
| 5,593,230 | 1/1997 | Tempest et al. | 384/118 |
| 5,659,445 | 8/1997 | Yoshida et al. | 384/118 |

FOREIGN PATENT DOCUMENTS

| 1613128 | 11/1967 | Germany . |
| 2952241 | 12/1979 | Germany . |
| 9112053.5 | 4/1991 | Germany . |
| 58-163818 | 9/1983 | Japan . |
| 647849 | 1/1989 | Japan . |
| 5106635 | 4/1993 | Japan . |
| 5-297308 | 11/1993 | Japan . |
| 6-10945 | 1/1994 | Japan . |
| 94/28323 | 12/1994 | WIPO . |

*Primary Examiner*—Stuart N. Hecker
*Attorney, Agent, or Firm*—Fitzpatrick, Cella, Harper & Scinto

[57] ABSTRACT

A dynamic-pressure gas bearing structure includes a columnar shaft made of a silicon-nitride-based ceramic sintered body, a hollow cylindrical sleeve opposed to the shaft as keeping a clearance in a radial direction, the sleeve being made of a silicon-nitride-based ceramic sintered body, and at least three flat face portions located on a peripheral surface of the shaft and at equal intervals to the circumference along the peripheral surface. The flat face portion includes a plurality of unit planes continuously formed at predetermined angles to a direction of the circumference on the peripheral surface of the shaft. The unit planes are formed so as to extend substantially in parallel with an axial direction of the shaft.

20 Claims, 4 Drawing Sheets

C: GROOVE
d: DEPTH
S: PERIPHERAL SURFACE OF SHAFT
θ: CENTER ANGLE

C : GROOVE d : DEPTH

S : PERIPHERAL SURFACE OF SHAFT

θ : CENTER ANGLE

DYNAMIC-PRESSURE GAS BEARING STRUCTURE AND OPTICAL DEFLECTION SCANNING APPARATUS

BACKGROUND OF THE INVENTION

1. Field of the Invention

The present invention generally relates to a dynamic-pressure gas bearing structure, and more particularly, to a bearing structure in a rotation drive part of an optical deflection scanning apparatus used for example in laser beam printers etc.

2. Related Background Art

Generally, members for constituting the rotation drive part of the optical deflection scanning apparatus used in the laser beam printer apparatus are required to be resistant to high-speed rotation. For example, with an increase of print speed a drive portion of a rotary polygon mirror for scanning with laser light is required to rotate at the rotational speed of 20000 or more rpm.

Ball bearings have been used heretofore in a bearing portion of this rotation drive part. However, sliding portions easily got into a lack of grease in the high-speed range of not less than about 12000 rpm, which increased a risk to cause seizure of ball bearing due to lubrication failure. It was thus difficult to form the rotation drive part to meet the demand of high-speed rotation as described above as long as the ball bearings were employed for the bearing portion of the rotation drive part.

In order to solve the above problem, a fluid dynamic-pressure bearing structure for supporting a rotor in a non-contact manner is employed for the rotation drive part. In the dynamic-pressure bearing structure of this type, herringbone or spiral grooves are formed on the peripheral surface of a shaft. Oil or grease is charged between the shaft and the sleeve, and a dynamic pressure occurs when the fluid is caught up into the above grooves during rotation, whereby, for example, the sleeve as a rotor can rotate without contact to the peripheral surface of shaft.

The fluid dynamic-pressure bearing structure as described above, however, has a defect that a drive torque is large because of high viscosity of the lubricating oil. Particularly, because the oil comes to have heat under high-speed rotation, it is necessary to prepare a mechanism for cooling the lubricating oil. This makes the structure of the optical deflection scanning apparatus itself complex and makes compactification of apparatus difficult. Further, complexity of apparatus raises the problem of an increase of manufacturing cost.

It has been considered to employ an air bearing using air as a fluid in the fluid dynamic-pressure bearing structure of the above type. Since this arrangement is free of occurrence of the problem due to the lubricating oil, it can be used under higher-speed rotation than the above bearing structure using the oil as a fluid can. It is considered that this structure can simplify the structure of apparatus itself because it does not need the mechanism for cooling the lubricating oil.

Even if employing the air bearing, there is, however, a possibility of direct sliding between opposed surfaces of the shaft and the sleeve because of disturbance or the like during rotation. This raised the problem that the risk to cause seizure in the sliding portions became greater than in the fluid dynamic-pressure bearing structure employing the oil as a fluid.

Then, Japanese Laid-open Patent Application No. 5-106635 discloses employing ceramics, particularly a silicon-nitride-based ceramic sintered body, as a material for the bearing portion. Since this can improve properties of wear resistance and shock resistance, bearing members obtained have high reliability against damage during high-speed rotation.

The shaft as shown in FIG. 1 is known as a dynamic-pressure air bearing member made of a ceramic material, applicable to the optical deflection scanning apparatus. As shown in FIG. 1, dynamic-pressure generating grooves 51 are formed on the peripheral surface 50 of the shaft.

It is, however, difficult to form by ordinary machining the groove shape shown in FIG. 1 on the surface of the hard-to-process material such as ceramics. Such groove shape is formed by etching, blasting, or the like.

Against it, Japanese Utility Model Publication No. 1-7849 discloses the dynamic-pressure gas bearing apparatus having the grooves easily formed by machining and having improved bearing accuracy. In this dynamic-pressure gas bearing apparatus there are a plurality of grooves on the peripheral surface of a cylindrical shaft, each groove having a lateral cross section which is arcuate in mirror symmetry and being parallel to the axial direction.

It is, however, very difficult to form the arcuate grooves in mirror symmetry as disclosed in the official gazette of Japanese Utility Model Publication No. 1-7849 in the hard-to-process material such as ceramics, particularly in the silicon-nitride-based ceramic sintered body. The depth of the grooves, according to the embodiment described in the official gazette, is determined within the range of some ten μm to some hundred μm. It has been practically impossible to put the formation of the grooves of such depth in the hard-to-process ceramic material into mass production on an industrial and economical basis in respect of processing accuracy, processing efficiency, and manufacturing cost.

SUMMARY OF THE INVENTION

It is, therefore, an object of the present invention to simplify the shape of the peripheral surface of the shaft in the rotation drive part in order to realize a dynamic-pressure gas bearing structure capable of stably rotating at higher speed and an optical deflection scanning apparatus provided therewith.

The dynamic-pressure gas bearing structure according to the present invention has a rotation drive part consisting a columnar shaft and a hollow cylindrical sleeve opposed to the shaft as keeping a clearance in the radial direction. The shaft and sleeve are made of a silicon-nitride-based ceramic sintered body. The peripheral surface of the shaft comprises at least three flat face portions located at equal intervals to the circumference along the peripheral surface. Each flat face portion is composed of a plurality of unit planes continuously formed in the peripheral surface of the shaft at predetermined angles with respect to the circumferential direction. Each unit plane is formed as extending substantially in parallel with the axial direction of the shaft.

From extensive and intensive study and research, the inventors found out that the arrangement wherein the at least three flat face portions each composed of a plurality of unit planes were located on the peripheral surface of the shaft was able to meet specified performance of the optical deflection scanning apparatus under high-speed rotation of not more than 25000 rpm. Specifically, as shown in FIGS. 2A and 2B, the peripheral surface 101 of the shaft 1 is ground in the depth of some μm to some ten μm to form planes parallel to the axial direction. Defining the planes as unit planes 105a, 105b, 105c, plural (three in FIGS. 2A and 2B) planes are continuously formed in the peripheral surface 101 of the shaft 1 at predetermined angles with respect to the circumferential direction. Flat face portions 105, each formed in the above arrangement, are located at equal intervals at at least three positions 102, 103, 104 with respect to the circumference along the peripheral surface 101 of the shaft.

Formation of the above flat face portions in the peripheral surface of shaft can be realized by removing parts from the peripheral surface of shaft being a nearly cylindrical surface by surface grinding. Processing is thus easy on hard-to-process ceramics such as the silicon-nitride-based sintered body. Accordingly, in forming a dynamic-pressure generating portion in the clearance between the shaft and the sleeve, the processing efficiency can be enhanced to thereby decrease manufacturing cost as compared with the conventional structure in which the grooves of specific shape are formed on the peripheral surface of shaft.

Further, excellent bearing stability can be secured under high-speed rotation of not less than 25000 rpm simply by providing the peripheral surface of the shaft with the flat face portions defined as described according to the present invention. The optical deflection scanning apparatus provided with the dynamic-pressure gas bearing structure of the present invention can achieve high accuracy as to inclination of laser beam reflecting faces relative to the vertical direction of the polygon mirror, that is, as to face inclination.

Further, the silicon-nitride-based ceramic sintered body is employed as a material for the shaft and the sleeve constituting the dynamic-pressure gas bearing structure of the present invention. Since the members made of this silicon-nitride-based ceramic sintered body are lighter than the conventional metal members, the inertial mass in motor load can be decreased. This permits reduction of drive torque, which enables the optical deflection scanning apparatus to be operated in lower dissipation power.

The inventors found out that, regarding a flat face portion composed of a combination of plural unit planes as a groove, stability under high-speed rotation was able to be achieved by forming the above grooves having the limited dimensions in the peripheral surface of the shaft. Specifically, regarding such flat face portion as the groove, three or more grooves C, each being formed, as shown in FIG. 2B, so that the groove depth d of the flat face portion may be not more than 0.020 mm and a center angle θ of the circumference (arc) along the peripheral surface 101 of the shaft, corresponding to the width of groove C, may be not less than 10°, are formed at equal intervals to the circumference along the peripheral surface 101 of the shaft. Further, a difference between the outer diameter of the shaft and the inner diameter of the sleeve is defined below 0.010 mm. The inventors found out that the bearing structure was able to demonstrate excellent bearing stability during high-speed rotation by forming the grooves C having the thus defined dimensions in the peripheral surface of shaft and limiting the clearance between the shaft and the sleeve as described above.

This can conceivably be achieved by the fact that a support membrane formed by a flow of air between the shaft and the sleeve can be formed with efficiency within the range of the limited dimensions as described above. It is also considered that the dynamically stable support structure can be provided by the feature that the support is simultaneously effected in directions equally distributed with respect to the circumference at three or more portions on the peripheral surface of shaft.

In contrast with it, unstable behavior is recognized as discussed above when the grooves having the depth of some 10 to some 100 μm are formed as described in Japanese Utility Model Publication No. 1-7849. A conceivable reason is as follows. As the grooves become deeper, disturbance occurs in the flow of air under high-speed rotation. The disturbance of the flow of air interrupts formation of an adequate support membrane between the shaft and the sleeve, thus causing unstable behavior.

The shape of the grooves can be arbitrarily selected within the range of the dimensions even in a case other than the combination of a plurality of unit planes described above as long as the combination of the depth and width of grooves and the difference between the outer diameter of the shaft and the inner diameter of the sleeve satisfy the above dimensional conditions. Specifically, the shape of the grooves is determined by requirements of manufacturing steps.

Applying the dynamic-pressure gas bearing structure of the present invention to the rotation drive part of the optical deflection scanning apparatus rotating at high speed and at high accuracy, a laser beam printer apparatus can be formed with higher print quality and with capability of higher-speed printing than those of the conventional apparatus.

DETAILED DESCRIPTION OF THE PREFERRED EMBODIMENTS

The present invention will be explained in detail, based on the embodiments shown in FIG. 2A to FIG. 6.

Embodiment 1

Figure 1:
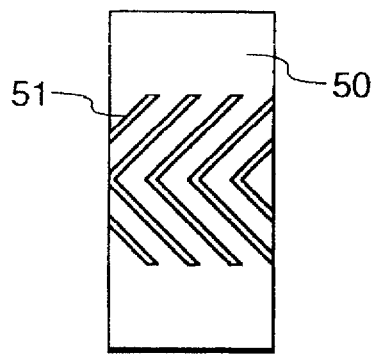
FIG. 1 is a side view to show the peripheral surface of the shaft as a conventional example of the shaft of the dynamic-pressure air bearing applied to the optical deflection scanning apparatus.
Figure 3:
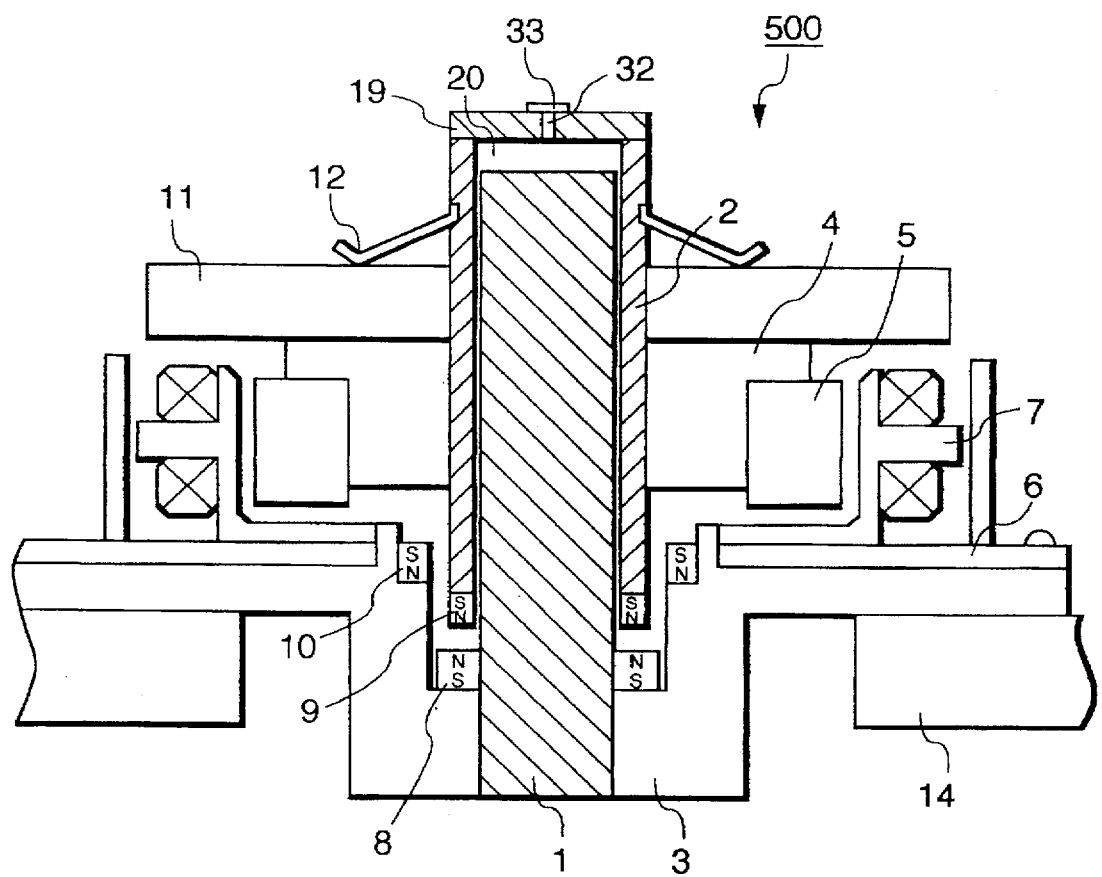
FIG. 3 is a schematic, structural drawing to show the rotation drive part of the optical deflection scanning apparatus according to the present invention.

FIG. 3 shows the details of the rotation drive part (the drive part of polygon mirror) of the optical deflection scanning apparatus provided with the dynamic-pressure gas bearing structure according to an embodiment of the present invention. The rotation drive part shown in FIG. 3 is incorporated in a laser beam printer apparatus using the optical deflection scanning apparatus shown in FIG. 4.

Figure 2A:
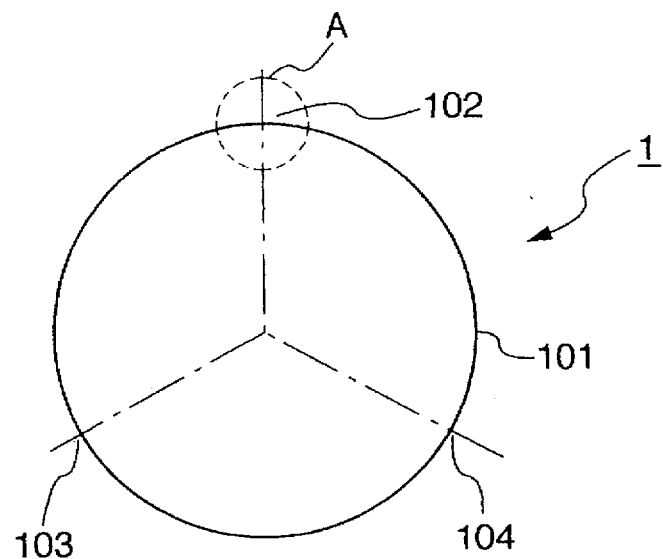
FIG. 2A is a lateral cross section to show an example of the shaft in the rotation drive part constituting the optical deflection scanning apparatus provided with the dynamic-pressure gas bearing structure of the present invention.
Figure 2B:
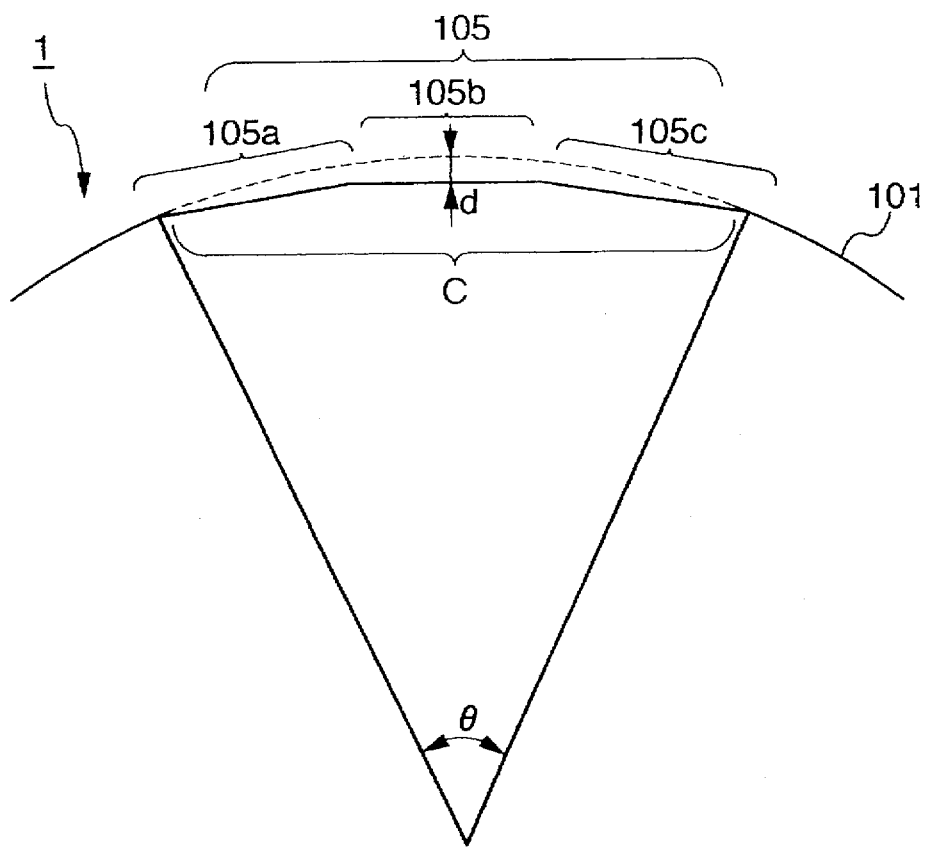
FIG. 2B is an enlarged, detailed drawing of part A in FIG. 2A.

In FIG. 3, a stationary shaft 1, which is a shaft made of a ceramic material, is fixed to a housing 3 of a drive motor 500. A rotary sleeve 2, which is a sleeve made of the ceramic material, is rotatably fit over the stationary shaft 1. In the peripheral surface 101 of the stationary shaft 1 there are at least three flat face portions 105 (unit processed portions) composed of plural unit planes 105a, 105b, 105c, . . . as shown in FIG. 2B. A flange 4 made of aluminum, brass, or the like is fixed by shrinkage fit or the like on the outer periphery of the rotary sleeve 2. A drive magnet 5 is fixed by adhesion or the like to the outer periphery of the flange 4. Further, a base 6 is fixed on the housing 3. A stator 7 is placed on the base 6 as opposed to the drive magnet 5, thereby forming the drive motor 500 for rotating the rotary sleeve 2.

On the other hand, a second permanent magnet 9 is fixed to the lower end of the rotary sleeve 2 so that one magnetic pole of the second permanent magnet 9 may be vertically opposed to the same magnetic pole of a first permanent magnet 8 placed on the stationary shaft 1. A third permanent magnet 10 is placed near the rotary sleeve 2 on housing 3 so as to exert a repulsive force in a direction to urge the second permanent magnet 9 fixed at the lower end of the rotary sleeve 2 toward the first permanent magnet 8 provided on the stationary shaft.

A lid 19 for covering the stationary shaft 1 is provided at the upper end of the rotary sleeve 2. This forms an air reservoir 20 between the rotary sleeve 2 and the stationary shaft 1. This lid 19 is provided with an air vent hole 32 to facilitate assembling of the rotary sleeve 2 and the stationary shaft 1. After the assembling a seal member 33 is fixed to the lid in order to seal the air vent hole 32.

Figure 4:
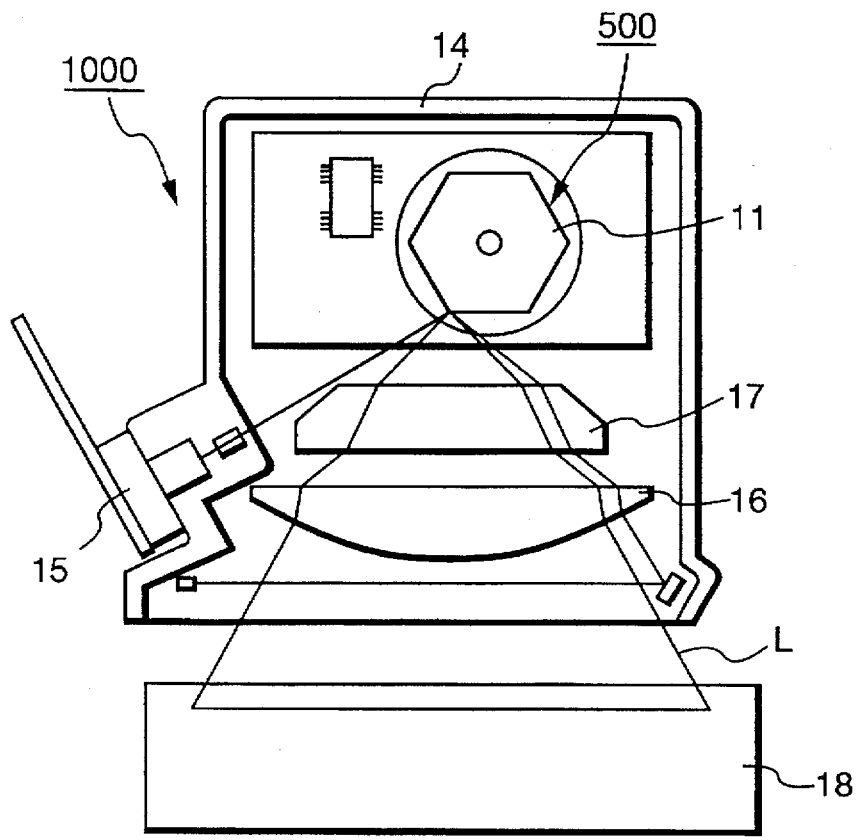
FIG. 4 is a schematic, structural drawing to show an embodiment of the laser beam printer apparatus using the optical deflection scanning apparatus according to the present invention.

The rotary polygon mirror 11 is fixed to the flange 4 by a plate spring 12 or the like. The drive motor 500 thus constructed is incorporated into an optical box 14 of the optical deflection scanning apparatus, as shown in FIG. 4. The rotary polygon mirror 11 is rotated by the drive motor 500. In FIG. 4, a laser unit 15 is disposed in the optical box 14. A laser beam L emitted from the laser unit 15 is condensed by lenses 16, 17, and deflection-scans a photosensitive member 18, which is a recording medium, with rotation of the rotary polygon mirror 11 by the drive motor 500.

The shaft 1 and sleeve 2 as shown in FIG. 3 are made of the silicon-nitride-based ceramic sintered body. The silicon-nitride-based sintered body is produced specifically as follows.

Prepared is raw powder of $Si_3N_4$ having the average grain diameter of 0.3 μm, the particle size distribution of 3σ=0.20 μm, the rate of α crystallinity of 96.5%, and the oxygen content of 1.4% by weight. Wet mixing using a polyamide ball mill is carried out in ethanol for 100 hours at the ratio of 90% by weight of the above raw powder of $Si_3N_4$, 4% by weight of $Y_2O_3$ powder with the average grain diameter of 0.8 μm, 3% by weight of $Al_2O_3$ powder with the average grain diameter of 0.5 μm, 1% by weight of AlN powder with the average grain diameter of 1.0 μm, and 2% by weight of MgO powder with the average grain diameter of 0.5 μm. After that, the mixture powder obtained after dried is subjected to CIP (cold isostatic pressing) under the pressure of 3000 kgf/cm². A formed body thus obtained is held at the temperature of 1450° C. under a nitrogen gas atmosphere of one atmospheric pressure for six hours. Further, it is primarily sintered at the temperature 1550° C. for three hours. A sintered body obtained is then secondarily sintered at the temperature of 1600° C. under a nitrogen gas atmosphere of 1000 atmospheric pressures for one hour.

The silicon-nitride-based sintered body thus obtained contains crystal particles in the linear density of 35 or more particles per length 30 μm, and the volume percentage of its grain boundary phase is not more than 15% by volume. Further, the silicon-nitride-based sintered body contains pores with the maximum diameter of not more than 20 μm, and the porosity of the pores is not more than 3%.

The shaft 1 and sleeve 2 are made of the silicon-nitride-based sintered body obtained in the above-described manner.

The shaft 1 is processed in the following method.

The surface of the shaft is ground using a grinding tool of diamond abrasive grains by an amount of the depth 10 μm, thus forming a plane on the peripheral surface of shaft. After processing of the above plane, the shaft is rotated and the same surface grinding as above is repeated so as to continuously connect the plane with planes at predetermined angles to the circumference along the peripheral surface of shaft. The flat face portion composed of a plurality of planes thus formed will be called as a unit processed portion. After completion of processing of this unit processed portion, further unit processed portions are formed in a necessary number on the peripheral surface of shaft. In this case, these unit processed portions are arranged at equal intervals to the circumference along the peripheral surface of shaft, depending upon the number of portions.

Embodiment 2

The sleeve and shaft made of the silicon-nitride-based sintered body were produced according to Embodiment 1. The flat face portions (unit processed portions) 105 as shown in FIG. 2B are formed at three positions 102, 103, 104, as shown in FIG. 2A, on the peripheral surface of shaft as equally distributed to the circumference. The sleeve 2 and shaft 1 thus prepared are incorporated in the rotation drive part of the optical deflection scanning apparatus as shown in FIG. 3.

As explained above, the dynamic-pressure gas bearing structure of the present invention has the rotation drive part including the columnar shaft 1 and the hollow cylindrical sleeve 2 opposed to the shaft as keeping a clearance in the radial direction. The shaft 1 and sleeve 2 are made of the silicon-nitride-based ceramic sintered body. The peripheral surface 101 of shaft includes the flat face portions 105 arranged at at least three positions 102, 103, 104 located at equal intervals to the circumference along the peripheral surface. Each flat face portion 105 is composed of a plurality of unit planes 105a, 105b, 105c continuously formed on the peripheral surface 101 of shaft at predetermined angles to the circumferential direction. The plurality of unit planes 105a, 105b, 105c are formed so as to extend substantially in parallel with the axial direction of shaft.

Stability of the dynamic-pressure gas bearing structure was next evaluated with the shaft and sleeve produced as described above.

Figure 5:
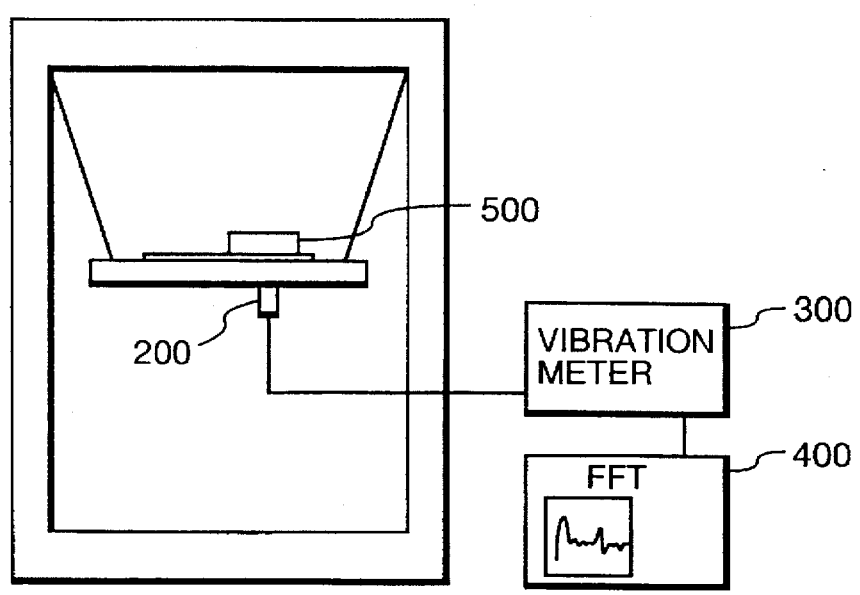
FIG. 5 is a schematic drawing to show an apparatus used for evaluating stability of the dynamic-pressure gas bearing structure of the present invention.

The rotation drive part of the optical deflection scanning apparatus in the structure shown in FIG. 3 was set in an evaluation apparatus shown in FIG. 5, and the rotation drive part was rotated at high speed of the number of revolutions of 25000 rpm. Vibration generated by the rotor during operation of the drive motor 500 was detected by a vibration pickup 200, was measured by a vibration meter 300, and was frequency-analyzed by FFT (fast Fourier transform apparatus) 400. A sample with no resonance appearing in the low-frequency region was determined as "stable".

In the following description, one flat face portion 105 composed of a combination of plural unit planes 105a, 105b, 105c is regarded as a groove C, as shown in FIG. 2B.

First evaluated was an effect of the number of grooves C comprised of the flat face portions 105 formed on the peripheral surface of shaft, on stability of bearing. As shown in Table 1, four shafts are prepared each with grooves in the same depth and width on the peripheral surface of shaft. Another shaft without grooves was also prepared. The number of grooves C was changed from shaft to shaft, and the grooves were arranged at equal intervals to the circumference along the peripheral surface of shaft. The shafts were coupled with respective sleeves to form scanner motors (the rotation drive parts of the optical deflection scanning apparatus) 500 so that differences (diameter differences) might become constant as shown in Table 1 between the outer diameter of the peripheral surface of shaft thus processed where no grooves were formed, and the inner diameter of the sleeve. Here, the width of grooves C is expressed by the center angle θ corresponding to a circular arc along the peripheral surface 101 of the shaft as shown in FIG. 2.

Regarding the flat face portion 10b as the groove, the groove depth d of the flat face portions 105 is an average value of differences between the arc part (the dashed line part) along the peripheral surface 101 of shaft and the plural unit planes 105a, 105b, 105c.

TABLE 1

| No. | No. of grooves | Groove width | Groove depth | Diameter difference | Judge |
| --- | --- | --- | --- | --- | --- |
| *1-1 | 1 | 15° | 5 μm | 7 μm | unstable |
| *1-2 | 2 | 15° | 5 μm | 7 μm | unstable |
| 1-3 | 3 | 15° | 5 μm | 7 μm | stable |
| 1-4 | 6 | 15° | 5 μm | 7 μm | stable |
| *1-5 | 0 | 0 | 0 | 7 μm | unstable |

*comparative examples

As apparent from Table 1, stability of bearing was recognized even under high-speed rotation of 25000 rpm with the samples having three or more grooves C.

Next evaluated was an effect of the depth of grooves of the flat face portions on the stability of bearing. Six shafts were prepared each with three grooves equally formed on the peripheral surface of shaft, but only the depth of grooves of the flat face portions was changed. The shafts were coupled with sleeves to form scanner motors as keeping constant the width of the grooves C formed on the peripheral surface of shaft and the difference between the outer diameter of the peripheral surface of shaft where no grooves were formed, and the inner diameter of sleeve. Stability of bearing was evaluated using the evaluation apparatus shown in FIG. 5.

TABLE 2

| No. | Groove depth | Groove width | Diameter difference | Judge |
| --- | --- | --- | --- | --- |
| 2-1 | 2 μm | 15° | 7 μm | stable |
| 2-2 | 5 μm | 15° | 7 μm | stable |
| 2-3 | 10 μm | 15° | 7 μm | stable |
| 2-4 | 20 μm | 15° | 7 μm | stable |
| *2-5 | 50 μm | 15° | 7 μm | unstable |
| *2-6 | 200 μm | 15° | 7 μm | unstable |

*comparative examples

As apparent from Table 2, it was recognized that the bearing became stabilized under high-speed rotation of 25000 rpm if the depth of grooves of the flat face portions was not more than 20 μm.

Next evaluated was an effect of the width of grooves C formed on the peripheral surface of shaft on the stability of bearing. Six shafts were prepared each with three grooves C formed on the peripheral surface of shaft as changing only the width of grooves C. As keeping constant the depth of the grooves formed on the peripheral surface of shaft and the difference between the outer diameter of the peripheral surface of shaft where no grooves were formed, and the inner diameter of sleeve, scanner motors were formed and evaluated as to the stability of bearing, using the evaluation apparatus shown in FIG. 5.

TABLE 3

| No. | Groove width | Groove depth | Diameter difference | Judge |
| --- | --- | --- | --- | --- |
| *3-1 | 3° | 5 μm | 7 μm | unstable |
| *3-2 | 7.5° | 5 μm | 7 μm | unstable |
| 3-3 | 10° | 5 μm | 7 μm | stable |
| 3-4 | 20° | 5 μm | 7 μm | stable |
| 3-5 | 40° | 5 μm | 7 μm | stable |
| 3-6 | 80° | 5 μm | 7 μm | stable |

*comparative examples

As apparent from Table 3, it was recognized that the bearing became stabilized under high-speed rotation of 25000 rpm if the center angle corresponding to the width of the grooves C comprised of the flat face portions 105 was not less than 10°.

Next evaluated was an effect of the diameter difference (the difference between the outer diameter of the peripheral surface of shaft where no grooves were formed and the inner diameter of sleeve) determined by the combination of shaft with sleeve on the stability of bearing. Five shafts were prepared each with three grooves formed on the peripheral surface of shaft as keeping constant the width and depth of grooves. Scanner motors were constructed by combining the shafts with sleeves as changing the difference between the outer diameter of the peripheral surface of shaft where no grooves were formed, and the inner diameter of sleeve, and evaluation of stability of bearing was carried out using the evaluation apparatus shown in FIG. 5.

TABLE 4

| No. | Diameter difference | Groove width | Groove depth | Judge |
| --- | --- | --- | --- | --- |
| 4-1 | 3 μm | 15° | 5 μm | stable |
| 4-2 | 5 μm | 15° | 5 μm | stable |
| 4-3 | 7 μm | 15° | 5 μm | stable |
| *4-4 | 10 μm | 15° | 5 μm | unstable |
| *4-5 | 15 μm | 15° | 5 μm | unstable |

*comparative examples

As apparent from Table 4, it was recognized that the bearing performance became stable even under high-speed rotation of 25000 rpm if the diameter difference is not more than 7 μm, namely, below 10 μm.

As explained above, the dynamic-pressure gas bearing structure of the present invention is constructed in such an arrangement that, regarding one flat face portion 105 composed of a combination of plural unit planes 105a, 105b, 105c as a groove C, the groove depth of the flat face portions 105 is not more than 0.020 mm and the flat face portions 105 have the groove width corresponding to the center angle of not less than 10° to the circumference along the peripheral surface 101 of the shaft 1.

It is also constructed in such a manner that the difference between the outer diameter of the shaft 1 and the inner diameter of the sleeve 2 is less than 0.010 mm.

Figure 6:
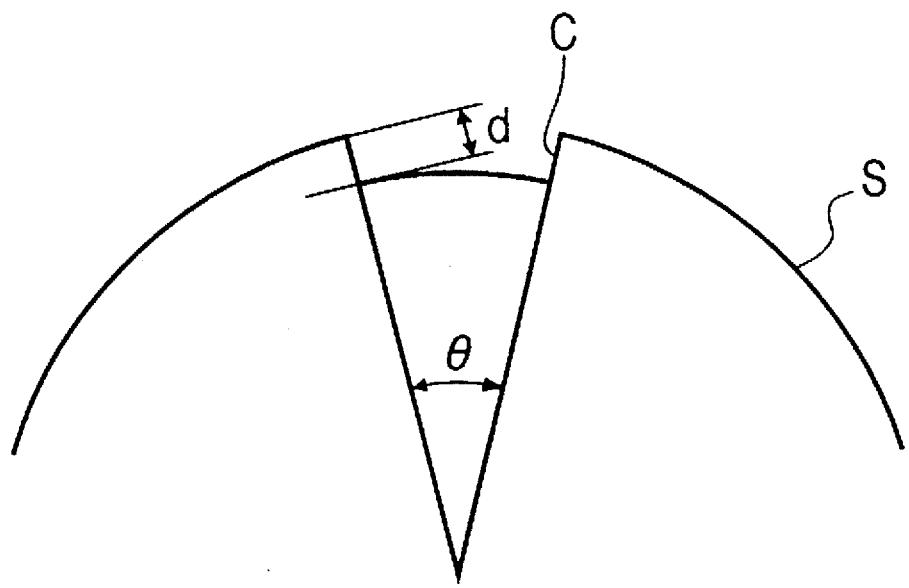
FIG. 6 is a drawing shown in order to define the depth and width of grooves formed on the peripheral surface of the shaft in the dynamic-pressure gas bearing structure of the present invention.

It should be noted that the shape of the grooves can be arbitrarily selected even in a case other than the combination of plural unit planes described above as long as the combination of the depth and width of grooves and the difference between the outer diameter of the shaft and the inner diameter of the sleeve satisfy the above dimensional conditions. For example, the shape of a groove shown in FIG. 6 is conceivable. Specifically, the shape of the grooves is determined by requirements of manufacturing steps.

Next, an overspeed test of motor was carried out in the optical deflection scanning apparatus constructed as described above. Changing the number of revolutions of motor, steady-state currents were measured at various numbers of revolutions. The steady-state current shows a measured value of current of the drive motor when the polygon mirror reaches steady-state rotation, which is a value corresponding to the drive torque. The face inclination was measured to evaluate the performance of the rotation drive part (scanner motor) of the optical deflection scanning apparatus. These measurement results are shown in Table 5.

TABLE 5

| rpm | 10000 rpm | 20000 rpm | 30000 rpm | 50000 rpm |
|---|---|---|---|---|
| steady-state current | 0.20 A | 0.21 A | 0.31 A | 0.52 A |
| face inclination | 38 sec | 42 sec | 56 sec | 65 sec |

As apparent from Table 5, the optical deflection scanning apparatus provided with the dynamic-pressure gas bearing structure according to the present invention can be obtained as an apparatus low in drive torque and high in rotation accuracy even under high-speed rotation.

Using the dynamic-pressure gas bearing of the present invention, the optical deflection scanning apparatus capable of scanning at higher speed can be realized with the shaft constituting the rotary drive part in the easily processable shape. The manufacturing cost of the optical deflection scanning apparatus can be reduced accordingly.

What is claimed is:

1. A dynamic-pressure gas bearing structure comprising:
    a columnar shaft made of a silicon-nitride-based ceramic sintered body;
    a hollow cylindrical sleeve opposed to said shaft as keeping a clearance in a radial direction, said sleeve being made of a silicon-nitride-based ceramic sintered body; and
    at least three flat face portions located on a peripheral surface of said shaft and at equal intervals to the circumference along said peripheral surface,
    wherein said flat face portion comprises a plurality of unit planes continuously formed at predetermined angles to a direction of said circumference on the peripheral surface of said shaft, and
    wherein said unit planes are formed so as to extend substantially in parallel with an axial direction of said shaft.

2. The dynamic-pressure gas bearing structure according to claim 1, wherein a difference between an outer diameter of said shaft and an inner diameter of said sleeve is less than 0.010 nm, and
    wherein when said flat face portion is regarded as a groove, said each flat face portion has the groove depth of not more than 0.020 nm and the groove width corresponding to a center angle of not less than 10° to the circumference along the peripheral surface of said shaft.

3. A bearing rotating apparatus comprising:
    a columnar shaft made of a silicon-nitride-based ceramic sintered body;
    a hollow cylindrical sleeve opposed to said shaft as keeping a clearance in a radial direction, said sleeve being made of a silicon-nitride-based ceramic sintered body;
    at least three flat face portions located on a peripheral surface of said shaft and at equal intervals to the circumference along said peripheral surface,
    wherein said flat face portion comprises a plurality of unit planes continuously formed at predetermined angles to a direction of said circumference on the peripheral surface of said shaft, and
    wherein said unit planes are formed so as to extend substantially in parallel with an axial direction of said shaft; and
    drive means for rotating said sleeve.

4. The bearing rotating apparatus according to claim 3, wherein a difference between an outer diameter of said shaft and an inner diameter of said sleeve is less than 0.010 nm, and
    wherein when said flat face portion is regarded as a groove, said each flat face portion has the groove depth of not more than 0.020 nm and the groove width corresponding to a center angle of not less than 10° to the circumference along the peripheral surface of said shaft.

5. An optical deflection scanning apparatus for performing deflection scanning of a light beam, comprising:
    a columnar shaft made of a silicon-nitride-based ceramic sintered body;
    a hollow cylindrical sleeve opposed to said shaft as keeping a clearance in a radial direction, said sleeve being made of a silicon-nitride-based ceramic sintered body;
    at least three flat face portions located on a peripheral surface of said shaft and at equal intervals to the circumference along said peripheral surface,
    wherein said flat face portion comprises a plurality of unit planes continuously formed at predetermined angles to a direction of said circumference on the peripheral surface of said shaft, and
    wherein said unit planes are formed so as to extend substantially in parallel with an axial direction of said shaft;
    drive means for rotating said sleeve; and
    a deflector mounted to said sleeve, for effecting deflection scanning of a light beam.

6. The optical deflection scanning apparatus according to claim 5, wherein a difference between an outer diameter of said shaft and an inner diameter of said sleeve is less than 0.010 nm, and
    wherein when said flat face portion is regarded as a groove, said each flat face portion has the groove depth of not more than 0.020 nm and the groove width corresponding to a center angle of not less than 10° to the circumference along the peripheral surface of said shaft.

7. An optical deflection scanning apparatus for performing deflection scanning of a light beam from a light source, comprising:
    a columnar shaft made of a silicon-nitride-based ceramic sintered body;
    a hollow cylindrical sleeve opposed to said shaft as keeping a clearance in a radial direction, said sleeve being made of a silicon-nitride-based ceramic sintered body;

at least three flat face portions located on a peripheral surface of said shaft and at equal intervals to the circumference along said peripheral surface, wherein said flat face portion comprises a plurality of unit planes continuously formed at predetermined angles to a direction of said circumference on the peripheral surface of said shaft, and wherein said unit planes are formed so as to extend substantially in parallel with an axial direction of said shaft;

drive means for rotating said sleeve;

a light source; and a deflector mounted to said sleeve, for effecting deflection scanning of a light beam from said light source.

8. The optical deflection scanning apparatus according to claim 7, wherein a difference between an outer diameter of said shaft and an inner diameter of said sleeve is less than 0.010 nm, and wherein when said flat face portion is regarded as a groove, said each flat face portion has the groove depth of not more than 0.020 nm and the groove width corresponding to a center angle of not less than 10° to the circumference along the peripheral surface of said shaft.

9. A laser beam printer apparatus comprising:

a columnar shaft made of a silicon-nitride-based ceramic sintered body;

a hollow cylindrical sleeve opposed to said shaft as keeping a clearance in a radial direction, said sleeve being made of a silicon-nitride-based ceramic sintered body;

at least three flat face portions located on a peripheral surface of said shaft and at equal intervals to the circumference along said peripheral surface, wherein said flat face portion comprises a plurality of unit planes continuously formed at predetermined angles to a direction of said circumference on the peripheral surface of said shaft, and wherein said unit planes are formed so as to extend substantially in parallel with an axial direction of said shaft;

drive means for rotating said sleeve;

a light source;

a deflector mounted to said sleeve, for effecting deflection scanning of a light beam from said light source; and a photosensitive member for receiving the light beam through deflection scanning by said deflector.

10. The laser beam printer apparatus according to claim 9, wherein a difference between an outer diameter of said shaft and an inner diameter of said sleeve is less than 0.010 nm, and wherein when said flat face portion is regarded as a groove, said each flat face portion has the groove depth of not more than 0.020 nm and the groove width corresponding to a center angle of not less than 10° to the circumference along the peripheral surface of said shaft.

11. A dynamic-pressure gas bearing structure comprising:

a columnar shaft;

a cylindrical sleeve opposed to said shaft as keeping a clearance in a radial direction; and grooves formed substantially in parallel with an axial direction on a peripheral surface of said shaft, wherein a difference between an outer diameter of said shaft and an inner diameter of said sleeve is less than 0.010 mm, and wherein a depth of said grooves is not more than 0.020 mm, said grooves have a width corresponding to a center angle of not less than 10° with respect to the circumference along the peripheral surface of said shaft, and said grooves are arranged at at least three positions separated at equal intervals relative to said circumference.

12. The dynamic-pressure gas bearing structure according to claim 11, wherein said shaft and said sleeve contain a silicon-nitride-based ceramic sintered body.

13. A bearing rotating apparatus comprising:

a columnar shaft;

a cylindrical sleeve opposed to said shaft as keeping a clearance in a radial direction;

grooves formed substantially in parallel with an axial direction on a peripheral surface of said shaft; and drive means for rotating said sleeve, wherein a difference between an outer diameter of said shaft and an inner diameter of said sleeve is less than 0.010 mm, and wherein a depth of said grooves is not more than 0.020 mm, said grooves have a width corresponding to a center angle of not less than 10° with respect to the circumference along the peripheral surface of said shaft, and said grooves are arranged at at least three positions separated at equal intervals relative to said circumference.

14. The bearing rotating apparatus according to claim 13, wherein said shaft and said sleeve contain a silicon-nitride-based ceramic sintered body.

15. An optical deflection scanning apparatus for effecting deflection scanning of a light beam, comprising:

a columnar shaft;

a cylindrical sleeve opposed to said shaft as keeping a clearance in a radial direction;

grooves formed substantially in parallel with an axial direction on a peripheral surface of said shaft;

drive means for rotating said sleeve; and a deflector mounted to said sleeve, for effecting deflection scanning of a light beam, wherein a difference between an outer diameter of said shaft and an inner diameter of said sleeve is less than 0.010 mm, and wherein a depth of said grooves is not more than 0.020 mm, said grooves have a width corresponding to a center angle of not less than 10° with respect to the circumference along the peripheral surface of said shaft, and said grooves are arranged at at least three positions separated at equal intervals relative to said circumference.

16. The optical deflection scanning apparatus according to claim 15, wherein said shaft and said sleeve contain a silicon-nitride-based ceramic sintered body.

17. An optical deflection scanning apparatus for effecting deflection scanning of a light beam from a light source, comprising:

a columnar shaft;

a cylindrical sleeve opposed to said shaft as keeping a clearance in a radial direction;

grooves formed substantially in parallel with an axial direction on a peripheral surface of said shaft;

drive means for rotating said sleeve;

a light source; and a deflector mounted to said sleeve, for effecting deflection scanning of a light beam from said light source, wherein a difference between an outer diameter of said shaft and an inner diameter of said sleeve is less than 0.010 mm, and wherein a depth of said grooves is not more than 0.020 mm, said grooves have a width corresponding to a center angle of not less than 10° with respect to the circumference along the peripheral surface of said shaft, and said grooves are arranged at at least three positions separated at equal intervals relative to said circumference.

18. The optical deflection scanning apparatus according to claim 17, wherein said shaft and said sleeve contain a silicon-nitride-based ceramic sintered body.

19. A laser beam printer apparatus comprising:

a columnar shaft;

a cylindrical sleeve opposed to said shaft as keeping a clearance in a radial direction;

grooves formed substantially in parallel with an axial direction on a peripheral surface of said shaft;

drive means for rotating said sleeve;

a light source;

a deflector mounted to said sleeve, for effecting deflection scanning of a light beam from said light source; and a photosensitive member for receiving the light beam through deflection scanning by said deflector, wherein a difference between an outer diameter of said shaft and an inner diameter of said sleeve is less than 0.010 mm, and wherein a depth of said grooves is not more than 0.020 mm, said grooves have a width corresponding to a center angle of not less than 10° with respect to the circumference along the peripheral surface of said shaft, and said grooves are arranged at at least three positions separated at equal intervals relative to said circumference.

20. The laser beam printer apparatus according claim 19, wherein said shaft and said sleeve contain silicon-nitride-based ceramic sintered body.

* * * * *